United States Patent [19]
Vandenbroucke

[11] 3,870,854
[45] Mar. 11, 1975

[54] ARC WELDING ELECTRODE

[75] Inventor: Gilbert Vandenbroucke, Zwevegem, Belgium

[73] Assignee: N. V. Behaert S.A., Zwevegem, Belgium

[22] Filed: Feb. 20, 1974

[21] Appl. No.: 444,057

[30] Foreign Application Priority Data
Feb. 20, 1973 Germany.............................. 2308298

[52] U.S. Cl.................. 219/145, 117/202, 219/146
[51] Int. Cl............................................. B23k 35/10
[58] Field of Search..................... 117/202; 148/31.5; 219/145, 146

[56] References Cited
UNITED STATES PATENTS

| | | | |
|---|---|---|---|
| 1,972,063 | 8/1934 | Judy..................................... | 117/202 |
| 3,028,269 | 4/1962 | Beattie et al..................... | 148/31.5 X |
| 3,408,528 | 10/1968 | Devime et al.................. | 219/145 X |
| 3,718,499 | 2/1973 | Kanter............................ | 148/31.5 X |
| 3,791,860 | 2/1974 | Zelley et al..................... | 219/146 X |

*Primary Examiner*—J. V. Truhe
*Assistant Examiner*—N. B. Herkamp
*Attorney, Agent, or Firm*—Shlesinger, Arkwright, Garvey & Dinsmore

[57] ABSTRACT

This disclosure relates to the provision of an elongated shielded arc welding electrode object of steel having a smooth and regular surface, the uncoated surface of which is not oxidized under normal atmospheric conditions in workshops, and therefore for example in atmospheric oxygen. This problem is solved by providing the electrode surface, by means of a thermal treatment, with a very thin and uniform covering layer containing "black" iron oxide ($Fe_3O_4$).

A preferred shape of electrode is the round wire electrode, and consequently the subject of the invention is explained with reference to the treatments and welding performances of treated wires.

12 Claims, 1 Drawing Figure

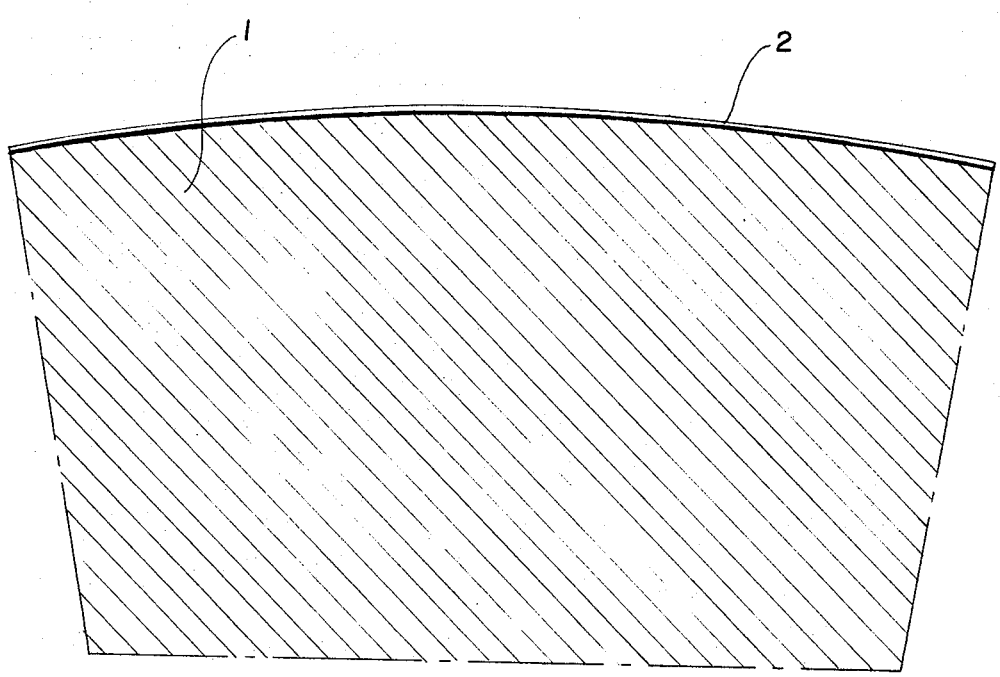

ARC WELDING ELECTRODE

The present invention relates to welding electrodes of steel, especially for use in automatic or semi-automatic shielded arc welding.

Hitherto, copper-coated wire electrodes of steels having low carbon content have preferably been used for the shielded arc welding of steel and cast iron (see for example German Patent DT-OS 1,919,296). The principal purpose of the protective coating is to inhibit the normal (usually irregular) atmospheric oxidation of the coiled electrode wire before it is used. The coating also contributes to the production of a smooth, uniform electrode surface, which also possesses good electrical conductivity.

It is also known that the wire electrodes may be provided with other protective coatings, for example zinc and silver, as for instance described in German Patents DT-AS 1,483,417 and DT-OS 1,950,063.

It has now been found that an additional metal coating, in particular a copper coating, to the wire electrodes for the purpose of inhibiting atmospheric oxidation can be omitted, if particular thermal treatments, to be described below, are applied to the wire electrodes.

The problem underlying the invention is therefore to provide an elongated shielded arc welding electrode article of steel having a smooth and regular surface, of which the uncoated surface does not oxidize under normal atmospheric conditions in workshops, and therefore for instance in atmospheric oxygen. This problem is solved by providing the electrode surface, by means of a thermal treatment, with a very thin and uniform covering layer containing black iron oxide ($Fe_3O_4$), also known as ferroferric oxide and sometimes designated $FeO.Fe_2O_3$.

The drawing is a schematic view of a greatly enlarged scale of a portion of an electrode according to this invention.

A preferred shape of electrode is certainly the round welding wire electrode, and consequently the subject of this invention is explained in relation to the treatment and welding performances of treated wires.

The usual steel welding wire or rod having a carbon content of 0.06 to 0.19% by weight, with 0.3 to 1.1% by weight silicon, 0.9–1.95% by weight manganese, remainder iron, and also steel welding wires or rods having a higher manganese content and containing less than 0.15% by weight nickel and approximately 0.5% by weight molybdenum are suitable for use as the starting product.

It is essential that the round welding wire according to the invention shall not only be of constant diameter but shall also possess a smooth, clean and uniform surface. This is achieved by very accurately and carefully drawing the wire and completely removing the residual soap and/or other substances from the wire surface. Following the wet drawing operation, the coiled wire is continuously annealed for example in atmospheric air at about 300°–550°C and so a very thin, well bonded and compact covering layer or film containing $Fe_3O_4$ is now formed upon the wire surface, giving to the wire a uniform blueish appearance. This covering layer protects the wire to a great extent against further atmospheric oxidation. The iron oxide structure is moreover so compact that, by contrast to the normal $Fe_2O_3$ oxide, it can scarcely be hydrolized by atmospheric moisture and therefore the wire surface does not gradually become porous and uneven during storage. The coating must contain a major amount of $Fe_3O_4$ and preferably in excess of 80% $Fe_3O_4$. More preferably, the coating will be at least 90% $Fe_3O_4$.

The annealing operation may also of course be carried out in other atmospheres, for example air-stream mixtures or air-protective gas mixtures. Higher temperatures, for example from about 600°C to 1000°C, may also be used. In this case, a predominantly FeO covering layer is then formed, which during cooling gradually and partly becomes converted to $Fe_3O_4$. A number of suitable covering layers can therefore be obtained by appropriate combinations of annealing temperature, annealing atmosphere, annealing residence time and cooling conditions.

The thinness of the film is also an important property, because this thinness makes possible its good deformability, and especially flexibility, without crack-formation occurring in the intrinsically hard oxide-containing structure.

The smoothness of the surface is thus retained. This is of importance, firstly in order to ensure a uniform contact with the current-transmitting clamps, and also in order to avoid jamming during unreeling. A constant rate of feed of the wire to the welding point is indeed a prerequisite for the stability of the arc and thus for successful welding. A film thickness less than 1 mu has proved favorable, although larger thicknesses up to about 3 mu are acceptable.

Considered overall, the good properties of the copper coating, that is oxidation inhibition and smoothness, are therefore retained, while at the same time the disadvantages of this additional coating are eliminated. In the first place, the measures according to the invention enable the coating operation, itself expensive, to be eliminated thus saving appreciable time and costs. In the second place, the welding material obtained is copper-free. The known brittleness of weld seams which contain copper is thereby avoided. In addition, the now undesired progressive increase in copper which occurs with resmelting of waste from welded iron, is favorably counteracted.

EXAMPLE

A round wire rod of steel comprising 0.06–0.12% by weight C, 0.7–1% by weight Si, and 1.3–1.6% by weight Mn, was drawn in the conventional manner to a diameter of 1.2 mm. The wet drawing operation was carefully carried out, and in particular the last wet drawing stage took place in oil, so that a bright surface was obtained; all residual soap was washed off the wire surface. After this, the wire was continuously passed through an annealing furnace in an air atmosphere at about 500°C and with a residence time of two minutes, and then after cooling was coiled up.

The wire had a blueish appearance, and an analysis of the wire surface layer showed that a covering layer having a content in excess of 90% $Fe_3O_4$ had been formed. The thickness of the covering layer was 0.8–0.9 mu, and the surface irregularities in no place exceeded 3 mu.

This wire was then used for semi-automatic $CO_2$ arc welding under normal welding conditions for coppered welding wires: voltage 23V, current 180A, electrode speed 6 m/minute.

The welding operations proceeded without difficulties and resulted in excellent weld seams.

Although round wires are the most obvious electrodes and are used for automatic and semi-automatic shielded arc welding processes, wire of other sections, for example having square, triangular or rectangular sections, may also be used.

Steel strips, either flat or to a greater or lesser extent bent about their longitudinal axis, may also be considered, likewise also stranded wires or steel cables, in which the constituent wires are preferably annealed after twisting. Other suitable combinations of the above-mentioned elongated steel members may also be used.

In the drawing, the figure is a schematic view on a greatly enlarged scale of a portion 1 of a representative wire cross-section according to this invention. The comparatively thin protective oxide coating is shown at 2.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. An arc welding electrode object of steel, characterized in that the elongated electrode member having a smooth surface comprises a uniform covering layer, at most 3 mu thick, containing $Fe_3O_4$.

2. An arc welding electrode according to claim 1, characterized in that the thickness of the covering layer is less than 1 mu.

3. A welding electrode according to claim 1, characterized in that the $Fe_3O_4$-content in the covering layer is at least 80% by weight.

4. A welding electrode according to claim 1, characterized in that the unevenness of the electrode surface does not exceed 3 mu.

5. The use of a welding electrode according to claim 1 in automatic or semi-automatic shielded arc welding processes.

6. The use of a welding electrode according to claim 5, characterized in that the protective gas consists at least partly of $CO_2$.

7. An elongate steel arc welding electrode having a smooth surface and a uniform tightly adherent coating containing a major amount of $Fe_3O_4$ and a thickness no greater than about 3 mu.

8. An arc welding electrode as in claim 7 and wherein said coating has a thickness of less than 1 mu.

9. An arc welding electrode as in claim 7 and wherein said coating is at least 80% by weight $Fe_3O_4$.

10. An arc welding electrode as in claim 7 and wherein the unevenness of the surface of said coating is less than about 3 mu.

11. The improvement in an automatic or semi-automatic gas shielded arc welding process which comprises carrying out said process with an electrode of claim 7.

12. An improved process as in claim 11 and wherein said process is carried out using a protective gas containing $CO_2$.

* * * * *